United States Patent
Sato (10) Patent No.: US 11,453,247 B2
(45) Date of Patent: Sep. 27, 2022

(54) PNEUMATIC TIRE

(71) Applicant: Toyo Tire Corporation, Itami (JP)

(72) Inventor: Yoshiki Sato, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 39 days.

(21) Appl. No.: 16/934,344

(22) Filed: Jul. 21, 2020

(65) Prior Publication Data

US 2021/0039442 A1 Feb. 11, 2021

(30) Foreign Application Priority Data

Aug. 7, 2019 (JP) ............................. JP2019-145289

(51) Int. Cl.
*B60C 11/03* (2006.01)
*B60C 11/12* (2006.01)

(52) U.S. Cl.
CPC .......... *B60C 11/0306* (2013.01); *B60C 11/12* (2013.01); *B60C 2011/0346* (2013.01)

(58) Field of Classification Search
CPC . B60C 11/0304; B60C 11/0306; B60C 11/11; B60C 11/12; B60C 11/1376; B60C 2011/0337; B60C 2011/0339; B60C 2011/0374; B60C 2011/0381; B60C 2011/0383
USPC ...................................................... 152/209.1
See application file for complete search history.

(56) References Cited

U.S. PATENT DOCUMENTS

| | | | | |
|---|---|---|---|---|
| 3,512,567 A | * | 5/1970 | Henri | ................. B60C 11/0306 152/209.18 |
| 5,435,366 A | * | 7/1995 | Voigt | ................. B60C 11/0302 152/209.18 |
| 2016/0089939 A1 | | 3/2016 | Oji | |
| 2017/0136830 A1 | | 5/2017 | Kuwano | |
| 2019/0275845 A1 | | 9/2019 | Herbst et al. | |

FOREIGN PATENT DOCUMENTS

| | | |
|---|---|---|
| DE | 102016215448 A1 | 2/2018 |
| JP | 2016-64781 A | 4/2016 |
| JP | 2017-088098 A | 5/2017 |

OTHER PUBLICATIONS

Office Action dated May 26, 2022, issued in counterpart CN application No. 202010673184.3 with English translation. (19 pages).

\* cited by examiner

*Primary Examiner* — Eric Hug
(74) *Attorney, Agent, or Firm* — WHDA, LLP (57) ABSTRACT

A pneumatic tire comprises at least one block partitioned by a block partitioning groove, the at least one block comprises a first block groove extending from an edge toward a first side in a tire circumferential direction of the at least one block so as to be directed toward a second side in the tire circumferential direction, and a second block groove extending from an edge toward the second side in the tire circumferential direction of the at least one block so as to be directed toward the first side in the tire circumferential direction, and the first block groove and the second block groove appear to overlap as viewed in a tire width direction.

10 Claims, 5 Drawing Sheets

PNEUMATIC TIRE

CROSS REFERENCE TO RELATED APPLICATIONS

This application claims the benefit of priority of Japanese application no. 2019-145289, filed on Aug. 7, 2019, which is incorporated herein by reference.

BACKGROUND OF THE INVENTION

Field of the Invention

The present disclosure relates to a pneumatic tire.

Description of the Related Art

Conventionally a pneumatic tire might, for example, comprise a plurality of blocks partitioned by groove(s) (e.g., JP2016-64781A). In addition, a tire associated with JP2016-64781A may be used when driving on snowy road surfaces. But to improve performance of the tire on snow, it is necessary to suppress lateral sliding of the tire.

The problem is therefore to provide a pneumatic tire permitting suppression of lateral sliding.

SUMMARY OF THE INVENTION

There is provided a pneumatic tire comprises:
at least one block partitioned by a block partitioning groove;
wherein the at least one block comprises a first block groove extending from an edge toward a first side in a tire circumferential direction of the at least one block so as to be directed toward a second side in the tire circumferential direction, and a second block groove extending from an edge toward the second side in the tire circumferential direction of the at least one block so as to be directed toward the first side in the tire circumferential direction; and
wherein the first block groove and the second block groove appear to overlap as viewed in a tire width direction.

Further, the pneumatic tire may have a configuration in which:
wherein the at least one block comprises a block central portion which is arranged between the first and second block grooves, a first block base portion which is contiguous with the block central portion, and a first block protruding portion which protrudes from the first block base portion in such fashion as to, together with the block central portion, straddle the first block groove; and
wherein width of the first block protruding portion decreases as one proceeds toward a tip thereof.

Further, the pneumatic tire may have a configuration in which:
wherein the first block protruding portion comprises first and second edges; and
wherein a side toward which the first edge is inclined with respect to the tire circumferential direction is opposite a side toward which the second edge is inclined with respect to the tire circumferential direction.

Further, the pneumatic tire may have a configuration in which:
wherein depth of the first block groove decreases as one proceeds toward the interior of the at least one block from an edge toward the first side in the tire circumferential direction of the at least one block.

Further, the pneumatic tire may further include:
at least one reinforcing portion which is arranged at the interior of the block partitioning groove and which is contiguous with the first block protruding portion.

Further, the pneumatic tire may have a configuration in which:
wherein the at least one reinforcing portion is contiguous with a tip of the first block protruding portion.

Further, the pneumatic tire may have a configuration in which:
wherein the at least one block comprises a block central portion which is arranged between the first and second block grooves; a first block base portion which is contiguous with the block central portion; a first block protruding portion which protrudes from the first block base portion in such fashion as to, together with the block central portion, straddle the first block groove; a second block base portion which is contiguous with the block central portion; and a second block protruding portion which protrudes from the second block base portion in such fashion as to, together with the block central portion, straddle the second block groove; and
wherein an angle at a corner which is in the block central portion but which is adjacent to neither the first nor the second block base portion is greater than an angle at a corner which is in the first block base portion but which is adjacent to neither the block central portion nor the first block protruding portion.

Further, the pneumatic tire may have a configuration in which:
wherein the at least one block comprises at least one sipe; and
a first end of the at least one sipe is contiguous with the first block groove, and a second end of the at least one sipe is located at the interior of the at least one block.

Further, the pneumatic tire may have a configuration in which:
wherein the at least one block comprises at least one sipe; and
a first end of the at least one sipe is contiguous with the second block groove, and a second end of the at least one sipe is located at the interior of the first block base portion of the at least one block.

Further, the pneumatic tire may have a configuration in which:
wherein the at least one block is arranged so as to intersect a tire equatorial plane.

DETAILED DESCRIPTION OF THE INVENTION

Below, an embodiment of a pneumatic tire is described with reference to FIG. 1 through FIG. 7. At the respective drawings, note that dimensional ratios at the drawings and actual dimensional ratios are not necessarily consistent, and note further that dimensional ratios are not necessarily consistent from drawing to drawing.

At the respective drawings, first direction D1 is the tire width direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Tire equatorial plane S1 refers to a plane that is located centrally in the tire width direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the curve formed by the intersection of tire equatorial plane S1 and the outer surface (tread surface 2a, described below) in the tire radial direction D2 of tire 1.

In the tire width direction D1, the side toward the interior is the side which is nearer to tire equatorial plane S1, and the side toward the exterior is the side which is farther from tire equatorial plane S1. Furthermore, in the tire radial direction D2, the side toward the interior is the side which is nearer to the tire rotational axis, and the side toward the exterior is the side which is farther from the tire rotational axis.

The tire width direction D1 may be further subdivided into what will be referred to as a first width direction side D1a toward one side (first side) D1a, and what will be referred to as a second width direction side D1b toward the other side (second side) D1b. Furthermore, the tire circumferential direction D3 may be further subdivided into what will be referred to as a first circumferential direction side D3a toward one side (first side) D3a, and what will be referred to as a second circumferential direction side D3b toward the other side (second side) D3b.

Figure 1:
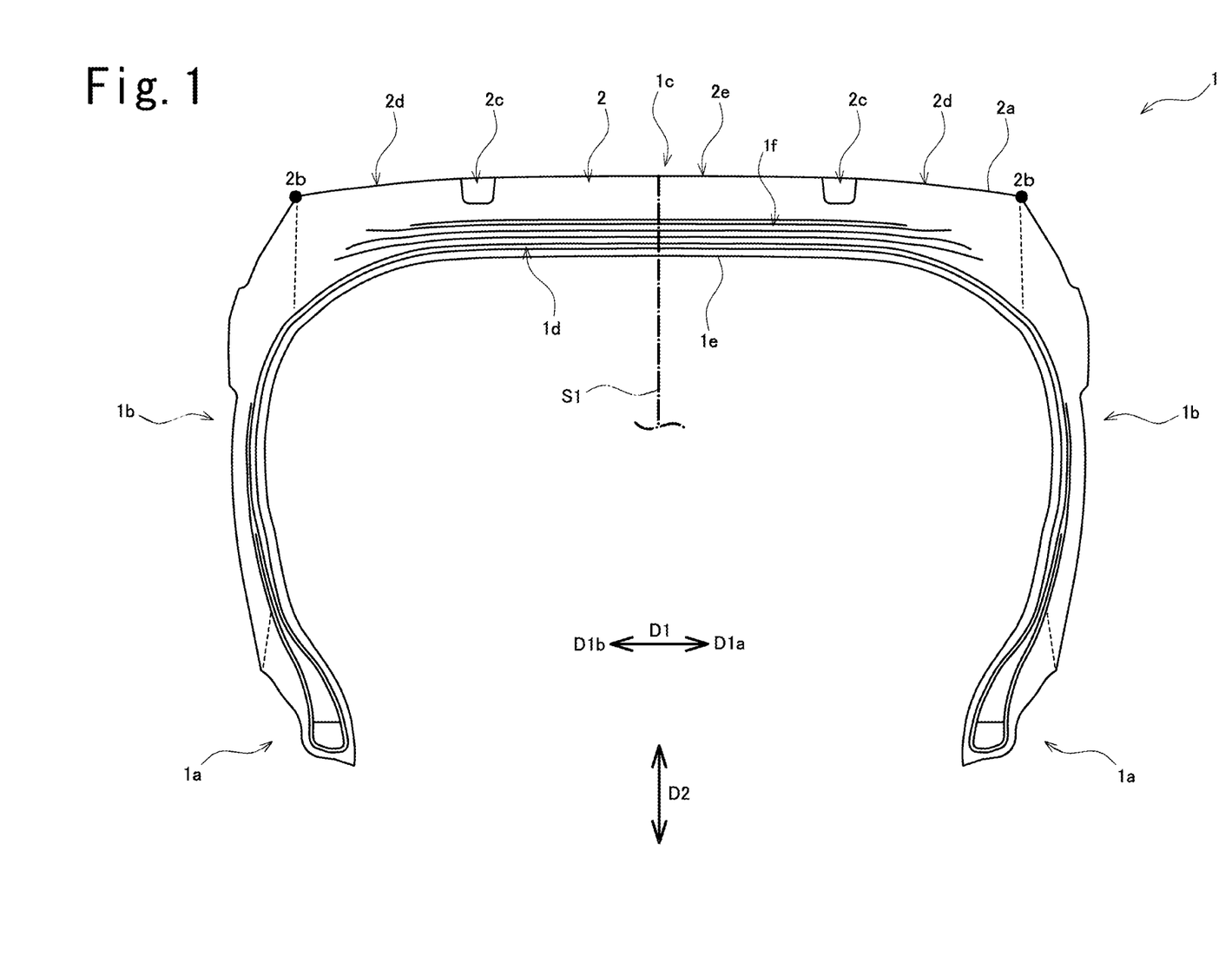
FIG. 1 is a view of a section, taken along a tire meridional plane, of the principal components in a pneumatic tire associated with an embodiment.

As shown in FIG. 1, tire 1 associated with the present embodiment is provided with a pair of bead regions 1a at which beads are present; sidewall regions 1b which extend outwardly in the tire radial direction D2 from the respective bead regions 1a; and tread region 1c, the exterior surface in the tire radial direction D2 of which contacts the road surface and which is contiguous with the outer ends in the tire radial direction D2 of the pair of sidewall regions 1b. In accordance with the present embodiment, tire 1 is a pneumatic tire 1, the interior of which is capable of being filled with air, and which is capable of being mounted on a rim (not shown).

Furthermore, tire 1 is provided with carcass layer 1d which spans the pair of beads, and innerliner layer 1e which is arranged at a location toward the interior from carcass layer 1d and which has superior functionality in terms of its ability to impede passage of gas therethrough so as to permit air pressure to be maintained. Carcass layer 1d and innerliner layer 1e are arranged in parallel fashion with respect to the inner circumferential surface of the tire over a portion thereof that encompasses bead regions 1a, sidewall regions 1b, and tread region 1c.

Tread region 1c is provided with tread rubber 2 having tread surface 2a which contacts the road surface, and belt layer 1f which is arranged between tread rubber 2 and carcass layer 1d. Present at tread surface 2a is the contact patch that actually comes in contact with the road surface, and the portions within said contact patch that are present at the outer ends in the tire width direction D1 are referred to as contact patch ends 2b, 2b.

Figure 2:
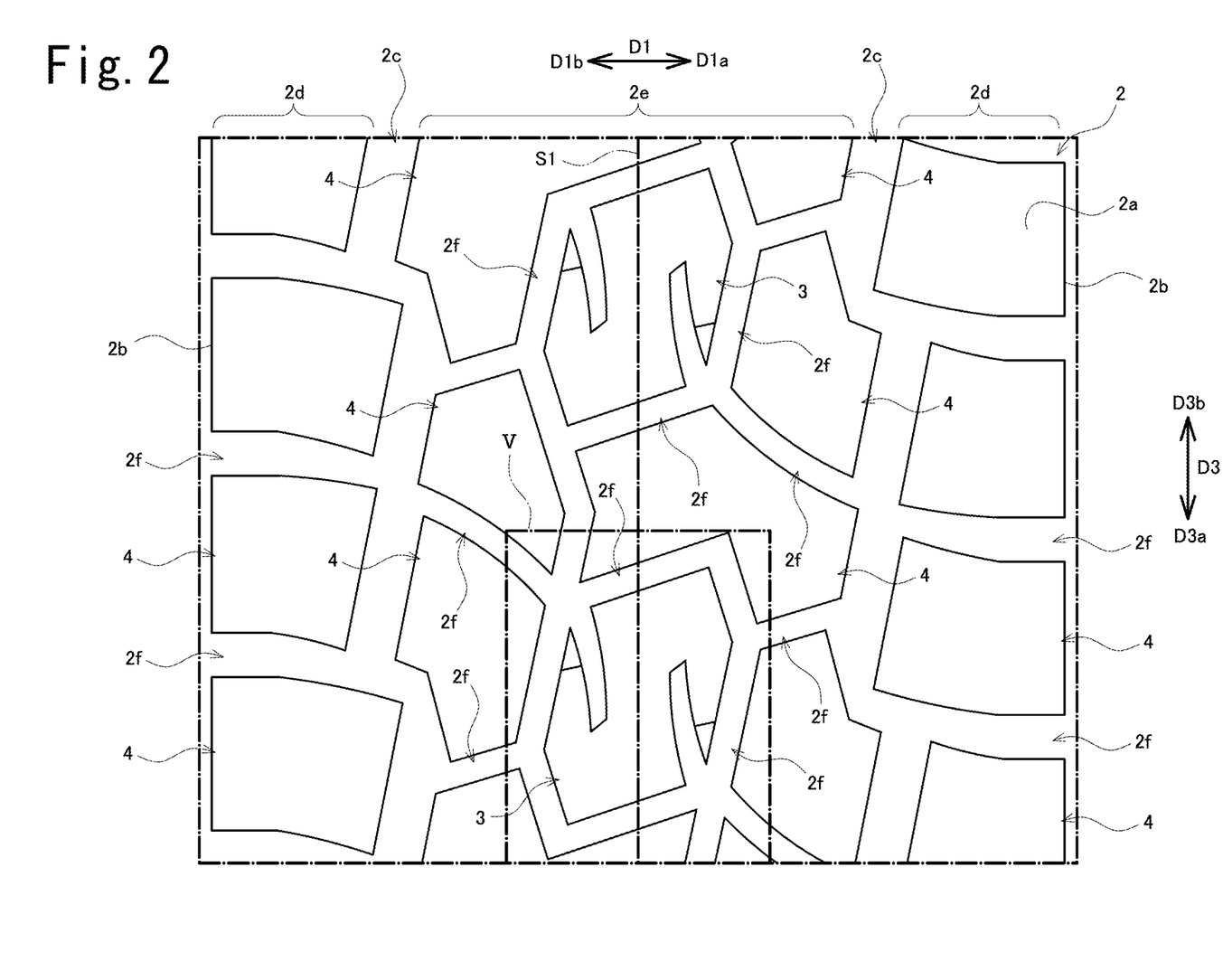
FIG. 2 is a drawing showing the principal components at the tread surface of a pneumatic tire associated with same embodiment as they would exist if unwrapped so as to lie in a single plane.

As shown in FIG. 1 and FIG. 2, tread rubber 2 comprises a plurality of main grooves 2c, 2c that extend in the tire circumferential direction D3. Main groove 2c extends continuously along the entire length of tire circumferential direction D3. In addition, the constitution is such that main groove 2c extends in zigzag fashion along the tire circumferential direction D3. Note that a constitution may also be adopted in which main groove 2c extends in parallel fashion with respect to the tire circumferential direction D3.

There is no limitation with respect thereto, it also being possible, for example, to adopt a constitution in which main groove 2c comprises so-called tread wear indicator(s) (not shown) which are portions at which depth of the groove is reduced so as to make it possible to ascertain the extent to which wear has occurred as a result of the exposure thereof that takes place in accompaniment to wear. Furthermore, while there is no particular limitation with respect to the number of main grooves 2c, the number of main grooves 2c that are present in the present embodiment is two.

Furthermore, while there is no particular limitation with respect thereto, it is also possible to adopt a constitution in which, for example, main grooves 2c are each of groove width not less than 3% of the distance (dimension in the tire width direction D1) between contact patch ends 2b, 2b. Furthermore, while there is no particular limitation with respect thereto, it is also possible to adopt a constitution in which, for example, main grooves 2c are each of groove width not less than 5 mm.

Tread rubber 2 comprises a plurality of land portions 2d, 2e that are partitioned by main groove(s) 2c, 2c and contact patch end(s) 2b, 2b. At the plurality of land portions 2d, 2e, land portion(s) 2d which are partitioned by main groove(s) 2c and contact patch end(s) 2b and which are arranged in outwardmost fashion in the tire width direction D1 are referred to as shoulder land portion(s) 2d, and land portion(s) 2e which are partitioned by the main grooves 2c, 2c that are respectively adjacent thereto and which are arranged between pair of shoulder land portions 2d, 2d are referred to as middle land portion(s) 2e.

Among middle land portion(s) 2e, note that those land portion(s) 2e which intersect tire equatorial plane S1 are referred to as center land portion(s) 2e. That is, the pair of main grooves 2c, 2c that partition center land portion(s) 2e are arranged so as to respectively be separated from tire equatorial plane S1 in the tire width direction D1. Furthermore, while there is no particular limitation with respect to the number of land portions 2d, 2e, because in the present embodiment the number of main grooves 2c that are present is two, the number of land portions 2d, 2e that are present is three, and the number of middle land portions 2e that are present is one.

As shown in FIG. 2, land portions 2d, 2e comprise a plurality of land grooves 2f extending in at least one of the tire width direction D1 and the tire circumferential direction D3. As a result, land portions 2d, 2e comprise a plurality of blocks 3, 4 that are partitioned by grooves 2c, 2f. In addition, the plurality of blocks 3, 4 are arrayed along the tire circumferential direction D3. While there is no particular limitation with respect thereto, note that it is also possible to adopt a constitution in which, for example, land grooves 2f have groove widths not less than 2 mm.

Middle land portion 2e comprises block(s) 3 partitioned by a plurality of land grooves 2f, and block(s) 4 partitioned by main groove(s) 2c and a plurality of land grooves 2f.

Shoulder land portion 2*d* comprises block(s) 4 partitioned by main groove(s) 2*c* and a plurality of land grooves 2*f*.

Note that it is also possible to adopt a constitution in which land portions 2*d*, 2*e* do not comprise blocks 3, 4 but are of rib-like shape, being continuous in the tire circumferential direction D3. That is, it is sufficient that at least one of land portions 2*d*, 2*e* be of block-like shape such that block(s) 3, 4 are arrayed along the tire circumferential direction D3 as a result of subdivision in the tire circumferential direction D3 by land grooves 2*f*.

The constitution of one particular type of block 3 will now be described with reference to FIG. 3 through FIG. 7. Below, this particular type of block 3 is referred to as first block 3, other types of blocks 4 being referred to as second block 4.

Figure 3:
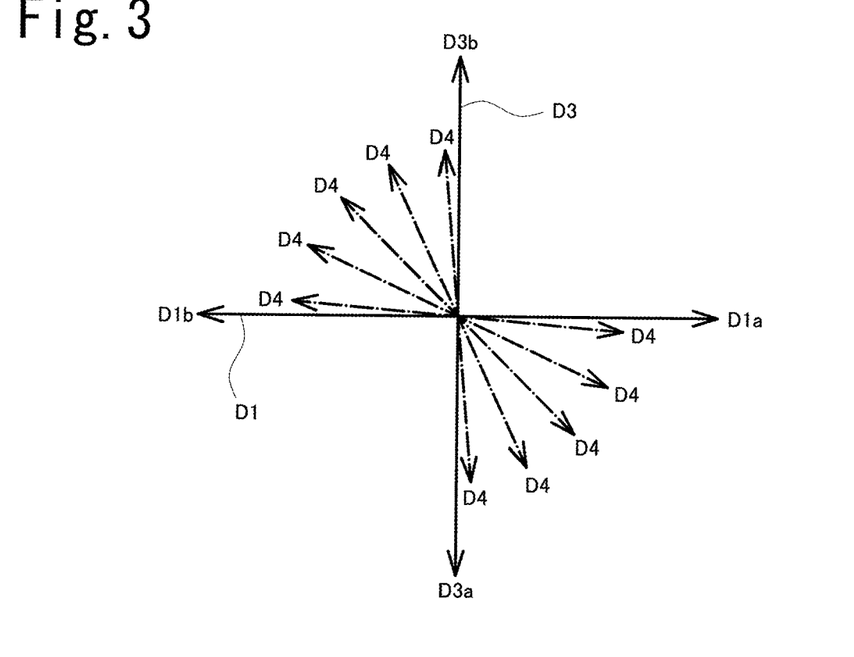
FIG. 3 is a drawing for explaining a first inclined side.
Figure 4:
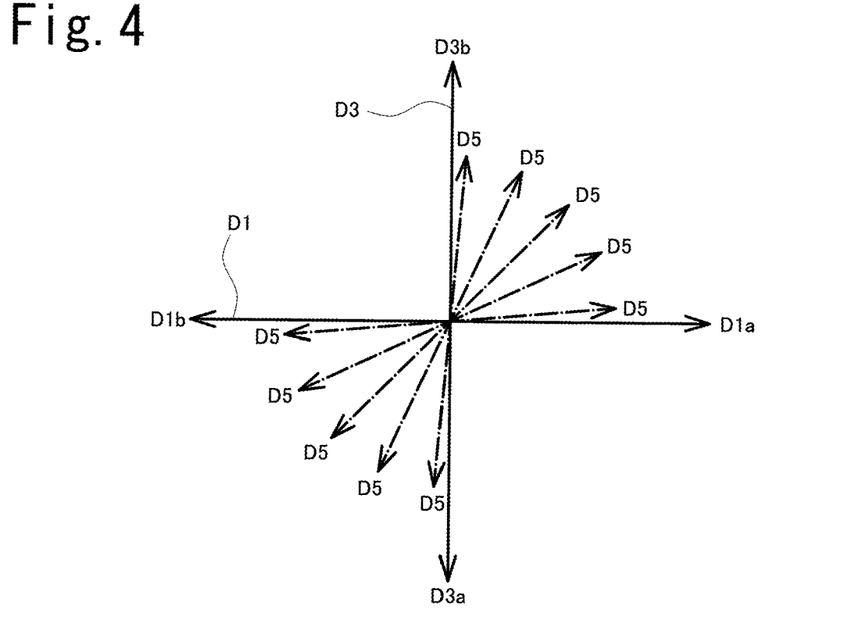
FIG. 4 is a drawing for explaining a second inclined side.

Note, as shown in FIG. 3, that the side D4 which is inclined in such fashion as to be increasingly directed toward first circumferential direction side D3*a* as one proceeds toward first width direction side D1*a* (the side which is inclined in such fashion as to be increasingly directed toward second circumferential direction side D3*b* as one proceeds toward second width direction side D1*b*) will be referred to as first inclined side D4. Furthermore, as shown in FIG. 4, the side D5 which is inclined in such fashion as to be increasingly directed toward second circumferential direction side D3*b* as one proceeds toward first width direction side D1*a* (the side which is inclined in such fashion as to be increasingly directed toward first circumferential direction side D3*a* as one proceeds toward second width direction side D1*b*) will be referred to as second inclined side D5.

In addition, where it is said that the side toward which something is inclined with respect to tire circumferential direction D3 (tire width direction D1) is the same as the side toward which something else is inclined with respect thereto, this means that the two are inclined toward the same side (e.g., first inclined side D4, D4 or second inclined side D5, D5). That is, where it is said that the side toward which something is inclined with respect to tire circumferential direction D3 (tire width direction D1) is the same as the side toward which something else is inclined with respect thereto, this should be understood to include the situation in which the two are inclined toward the same side D4, D4 (D5, D5) notwithstanding the fact that the angles of inclination thereof with respect to tire circumferential direction D3 (tire width direction D1) may be different.

Furthermore, where it is said that the side toward which something is inclined with respect to tire circumferential direction D3 (tire width direction D1) is opposite the side toward which something else is inclined with respect thereto, this means that the two are inclined toward opposite sides (first inclined side D4 and second inclined side D5). That is, where it is said that the side toward which something is inclined with respect to tire circumferential direction D3 (tire width direction D1) is opposite the side toward which something else is inclined with respect thereto, this should be understood to include the situation in which the two are inclined toward opposite sides D4, D5 notwithstanding the fact that the angles of inclination thereof with respect to tire circumferential direction D3 (tire width direction D1) may be the same.

Figure 5:
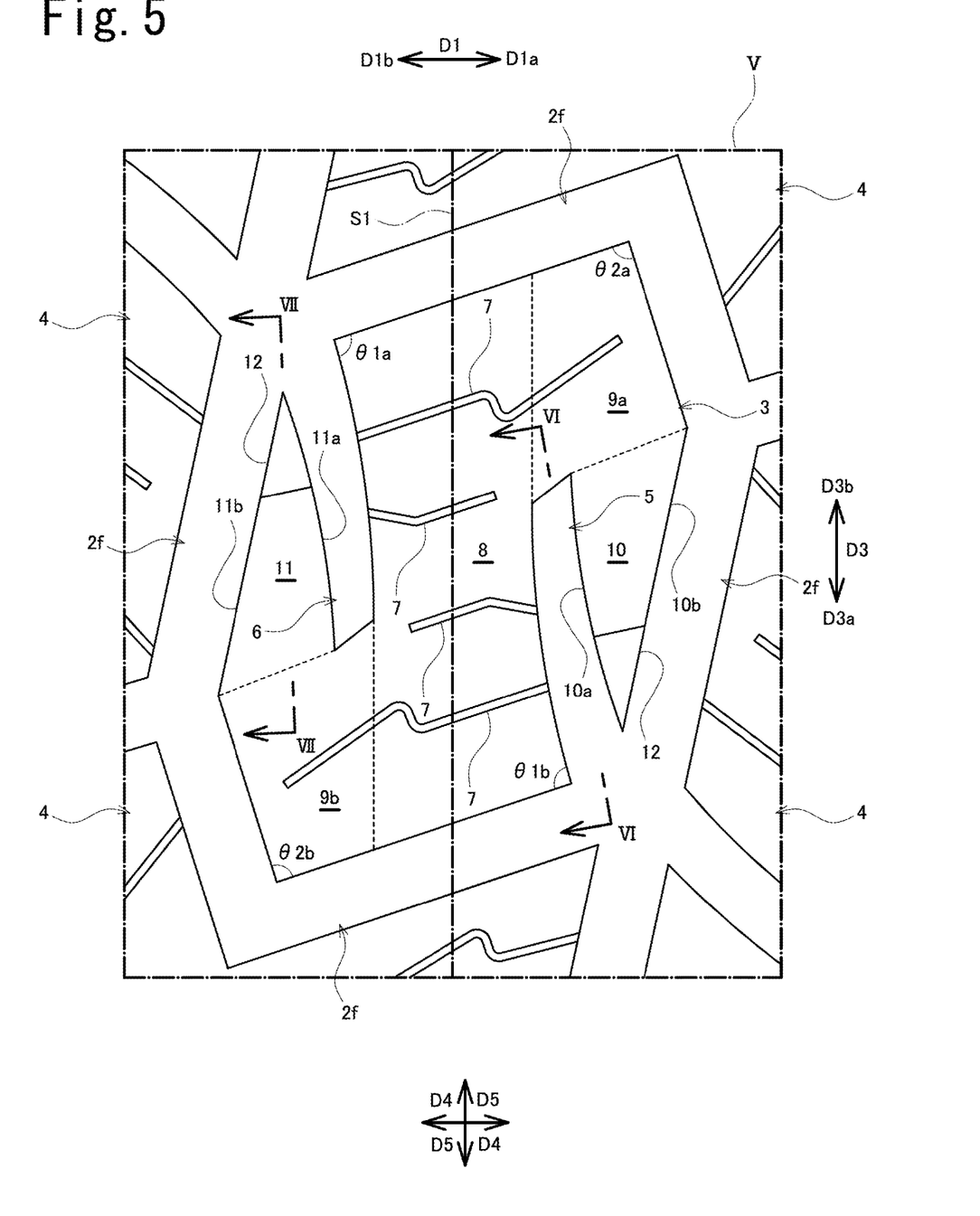
FIG. 5 is an enlarged view of region V in FIG. 2.

As shown in FIG. 5, first block 3 is provided with a pair of block grooves 5, 6, and a plurality of sipes 7. Note, for example, that, among the recesses 5 through 7 which are present at first block 3, recesses of width not less than 1.6 mm are referred to as block grooves 5, 6, and recesses of width less than 1.6 mm are referred to as sipes 7.

Block grooves 5, 6 extend in the tire circumferential direction D3 (the angle of inclination thereof with respect to the tire circumferential direction D3 might, for example, be less than 45°, it being preferred that this be less than 30°) from edge(s) in the tire circumferential direction D3 of first block 3 to location(s) at the interior of first block 3. More specifically, first block groove 5 extends from the edge at the first circumferential direction side D3*a* of first block 3 so as to be directed toward the second circumferential direction side D3*b*, and second block groove extends from the edge at the second circumferential direction side D3*b* of first block 3 so as to be directed toward the first circumferential direction side D3*a*.

One end of sipe 7 is contiguous with block groove 5, 6, and the other end of sipe 7 is located at the interior of first block 3. That is, one end of sipe 7 is open, and the other end of sipe 7 is closed. Note that it is also possible to adopt a constitution in which the two ends of sipe 7 are open, being contiguous with groove(s) 2*c*, 2*f*, 5, 6; and it is also possible to adopt a constitution in which the two ends of sipe 7 are closed, being located at the interior of first block 3. Furthermore, it is also possible to adopt a constitution in which first block 3 does not comprise sipe(s) 7.

In addition, first block 3 comprises block central portion 8 which is arranged between pair of block grooves 5, 6; block base portions 9*a*, 9*b* which are contiguous with block central portion 8; and block protruding portions 10, 11 which protrude from block base portions 9*a*, 9*b*. As a result, first block 3 is formed so as to be more or less S-shaped. At FIG. 3, note that boundaries between respective portions 8, 9*a*, 9*b*, 10, 11 are shown in broken line.

In addition, block base portions 9*a*, 9*b* are contiguous with the ends in the tire width direction D1 of block central portion 8. More specifically, first block base portion 9*a* is contiguous with first width direction side D1*a* of block central portion 8, and second block base portion 9*b* is contiguous with second width direction side D1*b* of block central portion 8.

Block protruding portions 10, 11 protrude so as to be directed in the tire circumferential direction D3 from block base portions 9*a*, 9*b*. More specifically, first block protruding portion 10 protrudes from first block base portion 9*a* so as to be directed toward the first circumferential direction side D3*a*, and second block protruding portion 11 protrudes from second block base portion 9*b* so as to be directed toward the second circumferential direction side D3*b*. As a result, first block protruding portion 10 and block central portion 8 straddle first block groove 5 in the tire width direction D1, and second block protruding portion 11 and block central portion 8 straddle second block groove 6 in the tire width direction D1.

In addition, because block grooves 5, 6 extend in the tire circumferential direction D3, edge components of block grooves 5, 6 extend in the tire circumferential direction D3. As a result, this permits functionality of edge components of block grooves 5, 6 to be made manifest when tire 1 experiences lateral sliding in the tire width direction D1 on a snowy road surface. Accordingly, it will be possible to suppress lateral sliding in the tire width direction D1 by tire 1 when on a snowy road surface.

Moreover, first block 3 is arranged so as to intersect the tire equatorial plane S1. As a result, when driving straight ahead, because contact patch length (length in the tire circumferential direction D3 where contact is made with the ground) in the central region in the tire width direction D1 will increase, it will be possible to cause a plurality of first blocks 3 to come in contact with the ground. This will make it possible to increase the number of edge components of block grooves 5, 6 that come in contact with the ground.

Moreover, because first block groove 5 and second block groove 6 appear to overlap as viewed in the tire width direction D1, it is possible to further increase the number of edge components of block grooves 5, 6 that come in contact with the ground. Furthermore, even under conditions in which only a portion of first block 3 comes in contact with the ground, it will be the case that edge component(s) of at least one of block groove(s) 5 and block groove(s) 6 will come in contact with the ground. Accordingly, it will be possible to effectively suppress lateral sliding in the tire width direction D1 by tire 1 when on a snowy road surface.

Furthermore, block protruding portions 10, 11 comprise respective edges 10a, 10b, 11a, 11b at either side thereof in the tire width direction D1. In addition, edges 10a, 10b, 11a, 11b extend in the tire circumferential direction D3 (the angle of inclination thereof with respect to the tire circumferential direction D3 might, for example, be less than 45°, it being preferred that this be less than 30°). Note that first edges 10a, 11a are also edges of block grooves 5, 6.

In addition, the side D4 toward which first edges 10a, 11a are inclined with respect to tire circumferential direction D3 is first inclined side D4, and the side D5 toward which second edges 10b, 11b are inclined with respect to tire circumferential direction D3 is second inclined side D5. That is, the side D4 toward which first edges 10a, 11a are inclined with respect to tire circumferential direction D3 is opposite the side D5 toward which second edges 10b, 11b are inclined with respect to tire circumferential direction D3.

As a result, with respect to lateral sliding toward sides D4, D5 inclined with respect to tire width direction D1 as well, it will be the case that functionality of edge component(s) attributable to at least one of edge(s) 10a, edge(s) 10b, edge(s) 11a, and edge(s) 11b will be made manifest. For example, with respect to lateral sliding toward first inclined side D4, functionality of edge component(s) attributable to at least second edge(s) 10b, 11b will be made manifest; furthermore, for example, with respect to lateral sliding toward second inclined side D5, functionality of edge component(s) attributable to at least first edge(s) 10a, 11a will be made manifest. Accordingly, it will be possible to effectively suppress lateral sliding by tire 1 when on a snowy road surface.

However, where snow remains within block groove(s) 5, 6 when contact is made with the ground on a snowy road surface, it may be the case that functionality of edge component(s) attributable to block groove(s) 5, 6 cannot adequately be made manifest. Widths of block protruding portions 10, 11 are therefore made to decrease as one proceeds toward the tips thereof. More specifically, width of first block protruding portion 10 decreases as one proceeds toward first circumferential direction side D3a, and width of second block protruding portion 11 decreases as one proceeds toward second circumferential direction side D3b.

As a result, elastic deformation can more readily occur toward the tips of block protruding portions 10, 11. Accordingly, even where snow has been pressed into the interior of block groove(s) 5, 6 when contact is made with the ground on a snowy road surface, elastic deformation of block protruding portions 10, 11 when these move away from the road surface will make it possible for snow to be removed from the interior of block groove(s) 5, 6. Accordingly, because it will be possible to suppress occurrence of situations in which snow remains within block groove(s) 5, 6 when contact is again made with the ground on a snowy road surface, it will be possible to cause functionality of edge component(s) attributable to block groove(s) 5, 6 to definitively be made manifest.

On the other hand, if rigidity of block protruding portion(s) 10, 11 becomes too low, there are situations in which this could cause reduction in tire performance. For example, it may be the case that functionality of edge component(s) attributable to edge(s) 10a, 10b, 11a, 11b of block protruding portion(s) 10, 11 cannot adequately be made manifest.

Figure 6:
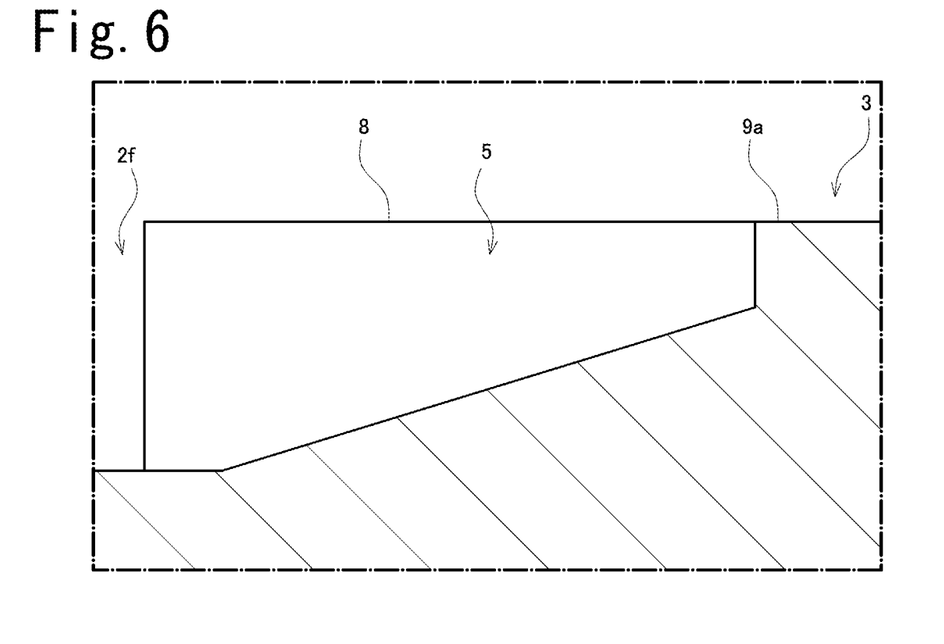
FIG. 6 is an enlarged view of a section taken along VI-VI in FIG. 5.

As shown in FIG. 5 and FIG. 6, depths of block grooves 5, 6 are therefore made to decrease as one proceeds from the edge in the tire circumferential direction D3 of first block 3 toward the interior of first block 3. More specifically, as shown in FIG. 6, depth of first block groove 5 decreases as one proceeds toward second circumferential direction side D3b; and while not shown in the drawing, depth of second block groove 6 decreases as one proceeds toward first circumferential direction side D3a.

This suppresses occurrence of situations in which rigidity of block protruding portion(s) 10, 11 becomes too low. Note that it is also possible to adopt a constitution in which depths of block grooves 5, 6 decrease in intermittent fashion (the groove bottoms are of staircase-like shape); in the present embodiment, the constitution is such that depths of block grooves 5, 6 decrease in continuous fashion (the groove bottoms are of smooth shape).

Figure 7:
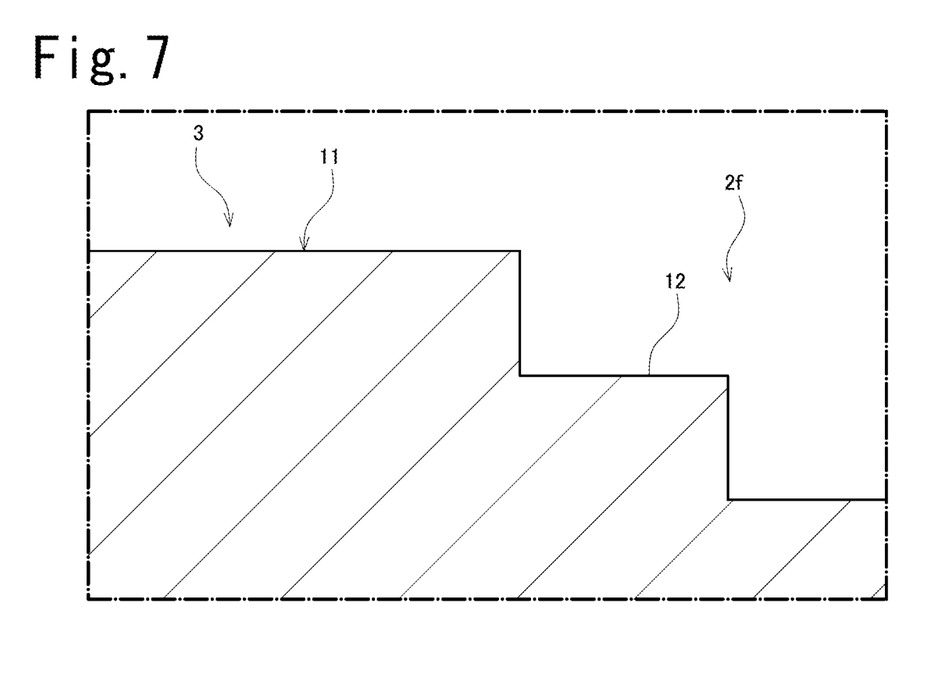
FIG. 7 is an enlarged view of a section taken along VII-VII in FIG. 5.

Moreover, as shown in FIG. 5 and FIG. 7, tire 1 comprises reinforcing portion(s) 12 adjacent to block protruding portion(s) 10, 11. Reinforcing portion 12 is arranged at the interior of land groove 2f. This suppresses occurrence of situations in which rigidity of block protruding portion(s) 10, 11 becomes too low. While there is no particular limitation with respect to the arrangement of reinforcing portion(s) 12, reinforcing portion 12 is contiguous with the tip side of block protruding portion 10, 11 in the present embodiment.

While there is no particular limitation with respect thereto, respective portions 8, 9a, 9b, 10, 11 are formed so as to be roughly quadrilateral in shape in the present embodiment. In addition, while there is no limitation with respect thereto, in accordance with the present embodiment, angles $\theta1a$, $\theta1b$ at corners (corners not adjacent to other portions 9a, 9b) of block central portion 8 are greater than angles $\theta2a$, $\theta2b$ at corners (corners not adjacent to other portions 8, 10, 11) of block base portions 9a, 9b ($\theta1a > \theta2a$; $\theta1b > \theta2b$).

As described above, the pneumatic tire 1 of the embodiment includes:

at least one block 3 partitioned by a block partitioning groove 2f;

wherein the at least one block 3 comprises a first block groove 5 extending from an edge toward a first side D3a in a tire circumferential direction D3 of the at least one block 3 so as to be directed toward a second side D3b in the tire circumferential direction D3, and a second block groove 6 extending from an edge toward the second side D3b in the tire circumferential direction D3 of the at least one block 3 so as to be directed toward the first side D3a in the tire circumferential direction D3; and wherein the first block groove 5 and the second block groove 6 appear to overlap as viewed in a tire width direction D1.

In accordance with such constitution, first block groove 5 extends from the edge at one side D3a in the tire circumferential direction D3 of block 3 so as to be directed toward the other side D3b in the tire circumferential direction D3, and second block groove 6 extends from the edge at the other side D3b in the tire circumferential direction D3 of block 3 so as to be directed toward the one side D3a in the tire circumferential direction D3. As a result, because edge components of block grooves 5, 6 extend in the tire circumferential direction D3, this will make it possible to suppress lateral sliding by means of the corresponding edge components.

Moreover, first block groove 5 and second block groove 6 appear to overlap as viewed in the tire width direction D1. This will make it possible to increase the number of edge components of block grooves 5, 6 that come in contact with the ground. And in addition, under conditions in which only a portion of first block 3 comes in contact with the ground, this will make it possible to suppress occurrence of situations in which edge components of both block grooves 5, 6 do not come in contact with the ground.

Further, in the pneumatic tire 1 of the embodiment, wherein the first block protruding portion 10 comprises first and second edges 10a, 10b; and wherein a side D4 toward which the first edge 10a is inclined with respect to the tire circumferential direction D3 is opposite a side D5 toward which the second edge 10b is inclined with respect to the tire circumferential direction D3.

In accordance with such constitution, the side D4 toward which edges 10a, 11a at one side of block protruding portion 10, 11 are inclined is opposite the side D5 toward which edges 10b, 11b at the other side of block protruding portion 10, 11 are inclined. As a result, with respect to lateral sliding toward sides D4, D5 inclined with respect to tire width direction D1 as well, it will be the case that functionality of edge component(s) attributable to at least one of edge(s) 10a, edge(s) 10b, edge(s) 11a, and edge(s) 11b will be made manifest.

Further, in the pneumatic tire 1 of the embodiment, wherein the at least one block 3 comprises a block central portion 8 which is arranged between the first and second block grooves 5, 6, a first block base portion 9a which is contiguous with the block central portion 8, and a first block protruding portion 10 which protrudes from the first block base portion 9a in such fashion as to, together with the block central portion 8, straddle the first block groove 5; and wherein width of the first block protruding portion 10 decreases as one proceeds toward a tip thereof.

In accordance with such constitution, block protruding portion 10, 11 and block central portion 8 are arranged in such fashion as to straddle block groove 5, 6. In addition, because widths of block protruding portions 10, 11 are made to decrease as one proceeds toward the tips thereof, elastic deformation can more readily occur toward the tips of block protruding portions 10, 11.

Further, in the pneumatic tire 1 of the embodiment, 4. The pneumatic tire according to claim 2 wherein depth of the first block groove 5 decreases as one proceeds toward the interior of the at least one block from an edge toward the first side D3a in the tire circumferential direction D3 of the at least one block 3.

In accordance with such constitution, whereas widths of block protruding portions 10, 11 are made to decrease as one proceeds toward the tips thereof, depths of block grooves 5, 6 are made to decrease as one proceeds toward the interior from either edge in the tire circumferential direction D3 of block 3. This makes it possible to suppress occurrence of situations in which rigidity of block protruding portion(s) 10, 11 becomes too low.

Further, the pneumatic tire 1 of the embodiment further includes:

at least one reinforcing portion 12 which is arranged at the interior of the block partitioning groove 12 and which is contiguous with the first block protruding portion 10.

In accordance with such constitution, whereas widths of block protruding portions 10, 11 are made to decrease as one proceeds toward the tips thereof, reinforcing portions 12 are made to be contiguous with block protruding portions 10, 11. This makes it possible to suppress occurrence of situations in which rigidity of block protruding portion(s) 10, 11 becomes too low.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that, among blocks 3, 4 arrayed in the tire circumferential direction D3, first blocks 3 at which pairs of block grooves 5, 6 are present are arranged in alternating fashion with second blocks 4 in the tire circumferential direction D3. However, pneumatic tire 1 is not limited to such constitution.

For example, it is also possible to adopt a constitution in which, among blocks 3, 4 arrayed in the tire circumferential direction D3, first blocks 3 are arranged in such fashion that one thereof is interposed with two or more of the other, and it is also possible to adopt a constitution in which these are arranged in continuous fashion. Note that it is preferred that first block(s) 3 be arranged in such fashion that at least one thereof will definitely make contact with the ground.

(2) Furthermore, the constitution of pneumatic tire 1 associated with the foregoing embodiment is such that first block 3 at which a pair of block grooves 5, 6 are present is arranged at middle land portion (more specifically, center land portion) 2e. However, pneumatic tire 1 is not limited to such constitution. For example, it is also possible to adopt a constitution in which said first block(s) 3 are arranged at shoulder land portion(s) 2d; and it is also possible to adopt a constitution in which, where a plurality of middle land portions 2e are provided, these are arranged at middle land portion(s) 2e other than center land portion 2e.

Note that it is preferred that first block 3 be arranged at a central region in the tire width direction D1. What is meant by said central region is the two regions arranged centrally in the tire width direction D1 when the region between contact patch ends 2b, 2b is evenly divided into four regions in the tire width direction D1.

(3) Furthermore, the constitution of pneumatic tire 1 associated with the foregoing embodiment is such that widths of block protruding portions 10, 11 are made to decrease as one proceeds toward the tips thereof. However, pneumatic tire 1 is not limited to such constitution. For example, it is also possible to adopt a constitution in which widths of block protruding portions 10, 11 are made to increase as one proceeds toward the tips thereof, and it is also possible to adopt a constitution in which these are uniform (here understood to mean not only the situation in which these are the same but also situations in which these are approximately the same) in the tire circumferential direction D3.

(4) Furthermore, the constitution of pneumatic tire 1 associated with the foregoing embodiment is such that widths of both first and second block protruding portions 10, 11 are made to decrease as one proceeds toward the tips thereof. However, pneumatic tire 1 is not limited to such constitution. For example, it is also possible to adopt a constitution in which widths of only one or the other of first and second block protruding portions 10, 11 are made to decrease as one proceeds toward the tips thereof.

(5) Furthermore, the constitution of pneumatic tire 1 associated with the foregoing embodiment is such that the side D4 toward which first edges 10*a*, 11*a* of block protruding portions 10, 11 are inclined with respect to tire circumferential direction D3 is opposite the side D5 toward which second edges 10*b*, 11*b* are inclined with respect to tire circumferential direction D3. However, pneumatic tire 1 is not limited to such constitution. For example, it is also possible to adopt a constitution in which the side toward which first edges 10*a*, 11*a* are inclined with respect to tire circumferential direction D3 is the same as the side toward which second edges 10*b*, 11*b* are inclined with respect to tire circumferential direction D3.

(6) Furthermore, the constitution of pneumatic tire 1 associated with the foregoing embodiment is such that, at both first and second block protruding portions 10, 11, the side D4 toward which first edges 10*a*, 11*a* are inclined is opposite the side D5 toward which second edges 10*b*, 11*b* are inclined. However, pneumatic tire 1 is not limited to such constitution. For example, it is also possible to adopt a constitution in which, at only one or the other of first and second block protruding portions 10, 11, the side D4 toward which first edges 10*a*, 11*a* are inclined is opposite the side D5 toward which second edges 10*b*, 11*b* are inclined.

(7) Furthermore, the constitution of pneumatic tire 1 associated with the foregoing embodiment is such that first edges 10*a*, 11*a* and second edges 10*b*, 11*b* at first and second block protruding portions 10, 11 extend in the tire circumferential direction D3. However, pneumatic tire 1 is not limited to such constitution. For example, it is also possible to adopt a constitution in which second edges 10*b*, 11*b* at first and second block protruding portions 10, 11 extend in the tire width direction D1 (e.g., the angle of inclination thereof with respect to the tire width direction D1 is less than 45°).

(8) Furthermore, the constitution of pneumatic tire 1 associated with the foregoing embodiment is such that depths of block grooves 5, 6 decrease as one proceeds toward the interior from the edge in the tire circumferential direction D3 of block 3. However, pneumatic tire 1 is not limited to such constitution. For example, it is also possible to adopt a constitution in which depths of block grooves 5, 6 are uniform (here understood to mean not only the situation in which these are the same but also situations in which these are approximately the same).

(9) Furthermore, the constitution of pneumatic tire 1 associated with the foregoing embodiment is such that, at both first and second block grooves 5, 6, depth decreases as one proceeds toward the interior from the edge in the tire circumferential direction D3 of block 3. However, pneumatic tire 1 is not limited to such constitution. For example, it is also possible to adopt a constitution in which, at only one or the other of first and second block grooves 5, 6, depth decreases as one proceeds toward the interior from the edge in the tire circumferential direction D3 of block 3.

(10) Furthermore, the constitution of pneumatic tire 1 associated with the foregoing embodiment is such that reinforcing portions 12 are adjacent to both first and second block protruding portions 10, 11. However, pneumatic tire 1 is not limited to such constitution. For example, it is also possible to adopt a constitution in which reinforcing portions 12 are adjacent to only one or the other of first and second block protruding portions 10, 11, and it is also possible to adopt a constitution in which reinforcing portion(s) 12 are not provided.

(11) Furthermore, the constitution of pneumatic tire 1 associated with the foregoing embodiment is such that the number of block grooves 5, 6 that are present at first block 3 is two. However, pneumatic tire 1 is not limited to such constitution. For example, it is also possible to adopt a constitution in which the number of block grooves 5, 6 that are present at first block 3 is three or more.

(12) Furthermore, while pneumatic tire 1 may be used when driving on snowy road surfaces, there is no limitation with respect to such use. For example, pneumatic tire 1 may be used when driving on dry road surfaces; or may, for example, be used when driving on wet road surfaces; or may, for example, be used when driving on adverse road surfaces (e.g., in muddy terrain or rocky terrain).

In particular, pneumatic tire 1 is capable of causing functionality of respective edge components to be made manifest on adverse road surfaces in muddy terrain. More specifically, by for example causing functionality of edge component(s) attributable to block groove(s) 5, 6 to be made manifest it is possible to suppress lateral sliding of tire 1 in the tire width direction D1 on adverse road surfaces, and by for example causing functionality of edge component(s) attributable to edge(s) 10*a*, 10*b*, 11*a*, 11*b* of block protruding portion(s) 10, 11 to be made manifest it is possible to suppress lateral sliding of tire 1 toward inclined side(s) D4, D5 with respect to the tire width direction D1 on adverse road surfaces.

The invention claimed is:

1. A pneumatic tire comprising at least one block partitioned by a block partitioning groove;
    wherein the at least one block comprises a first block groove extending from an edge at a corner of the at least one block toward a first side in a tire circumferential direction of the at least one block so as to be directed toward a second side in the tire circumferential direction, and a second block groove extending from an edge at another corner of the at least one block toward the second side in the tire circumferential direction of the at least one block so as to be directed toward the first side in the tire circumferential direction; and
    wherein the first block groove and the second block groove overlap as viewed in a tire width direction, and
    wherein each of the first block groove and the second block groove has an edge which extends at an angle of less than 30° with respect to the tire circumferential direction.

2. The pneumatic tire according to claim 1
    wherein the at least one block comprises at least one sipe; and
    a first end of the at least one sipe is contiguous with the first block groove, and a second end of the at least one sipe is located at the interior of the at least one block.

3. The pneumatic tire according to claim 1
    wherein the at least one block is arranged so as to intersect a tire equatorial plane.

4. A pneumatic tire comprising at least one block partitioned by a block partitioning groove;
    wherein the at least one block comprises a first block groove extending from an edge toward a first side in a tire circumferential direction of the at least one block so as to be directed toward a second side in the tire circumferential direction, and a second block groove extending from an edge toward the second side in the tire circumferential direction of the at least one block so as to be directed toward the first side in the tire circumferential direction; and wherein the first block groove and the second block groove overlap as viewed in a tire width direction, wherein the at least one block comprises a block central portion which is arranged between the first and second block grooves, a first block base portion which is contiguous with the block central portion, and a first block protruding portion which protrudes from the first block base portion in such fashion as to, together with the block central portion, straddle the first block groove; and wherein width of the first block protruding portion decreases as one proceeds toward a tip thereof.

5. The pneumatic tire according to claim 4
wherein the first block protruding portion comprises first and second edges; and
wherein a side toward which the first edge is inclined with respect to the tire circumferential direction is opposite a side toward which the second edge is inclined with respect to the tire circumferential direction.

6. The pneumatic tire according to claim 4
wherein depth of the first block groove decreases as one proceeds toward the interior of the at least one block from an edge toward the first side in the tire circumferential direction of the at least one block.

7. The pneumatic tire according to claim 4 further comprising at least one reinforcing portion which is arranged at the interior of the block partitioning groove and which is contiguous with the first block protruding portion.

8. The pneumatic tire according to claim 7
wherein the at least one reinforcing portion is contiguous with a tip of the first block protruding portion.

9. The pneumatic tire according to claim 4
wherein the at least one block comprises at least one sipe; and
a first end of the at least one sipe is contiguous with the second block groove, and a second end of the at least one sipe is located at the interior of the first block base portion of the at least one block.

10. A pneumatic tire comprising at least one block partitioned by a block partitioning groove;
wherein the at least one block comprises a first block groove extending from an edge toward a first side in a tire circumferential direction of the at least one block so as to be directed toward a second side in the tire circumferential direction, and a second block groove extending from an edge toward the second side in the tire circumferential direction of the at least one block so as to be directed toward the first side in the tire circumferential direction; and wherein the first block groove and the second block groove overlap as viewed in a tire width direction, wherein the at least one block comprises a block central portion which is arranged between the first and second block grooves; a first block base portion which is contiguous with the block central portion; a first block protruding portion which protrudes from the first block base portion in such fashion as to, together with the block central portion, straddle the first block groove; a second block base portion which is contiguous with the block central portion; and a second block protruding portion which protrudes from the second block base portion in such fashion as to, together with the block central portion, straddle the second block groove; and wherein an angle at a corner which is in the block central portion but which is adjacent to neither the first nor the second block base portion is greater than an angle at a corner which is in the first block base portion but which is adjacent to neither the block central portion nor the first block protruding portion.

* * * * *